United States Patent
Sepe et al.

(10) Patent No.: US 10,883,538 B2
(45) Date of Patent: Jan. 5, 2021

(54) METHOD TO MONITOR A THRUST LOAD ON A ROLLING BEARING AND MACHINERY EQUIPPED WITH A SYSTEM TO MONITOR SAID THRUST LOAD

(71) Applicant: Nuovo Pignone Tecnologie Srl, Florence (IT)

(72) Inventors: Marzia Sepe, Florence (IT); Stefano Cioncolini, Florence (IT); Riccardo Garbin, San Casciano (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 190 days.

(21) Appl. No.: 16/080,354

(22) PCT Filed: Mar. 20, 2017

(86) PCT No.: PCT/EP2017/056497
§ 371 (c)(1),
(2) Date: Aug. 28, 2018

(87) PCT Pub. No.: WO2017/162551
PCT Pub. Date: Sep. 28, 2017

(65) Prior Publication Data
US 2019/0048928 A1 Feb. 14, 2019

(30) Foreign Application Priority Data
Mar. 21, 2016 (IT) .......................... 102016000029356

(51) Int. Cl.
*G01M 13/04* (2019.01)
*F16C 19/52* (2006.01)
*G01P 3/44* (2006.01)
*F16C 41/00* (2006.01)
*F16C 19/16* (2006.01)
*F16C 33/38* (2006.01)

(52) U.S. Cl.
CPC ........... *F16C 19/522* (2013.01); *G01M 13/04* (2013.01); *G01P 3/443* (2013.01); *F16C 19/16* (2013.01);
(Continued)

(58) Field of Classification Search
CPC ....................................................... F16C 19/522
(Continued)

(56) References Cited

U.S. PATENT DOCUMENTS

| 9,618,037 B2 * | 4/2017 | Kar .......................... F16C 19/52 |
| 2006/0155507 A1 * | 7/2006 | Yanagisawa .......... G01M 13/04 702/145 |

(Continued)

FOREIGN PATENT DOCUMENTS

WO    2005/026680 A1    3/2005

OTHER PUBLICATIONS

Liao, N. T., and Lin, J. F., "Ball bearing skidding under radial and axial loads", Mechanism and Machine Theory, vol. 37, Issue 1, pp. 91-113 (Jan. 2002).

(Continued)

*Primary Examiner* — Ricky Ngon
(74) *Attorney, Agent, or Firm* — Baker Hughes Patent Org.

(57) ABSTRACT

A method to monitor a thrust load on a rolling bearing, obtaining a first parameter on the basis of at least a bearing cage rotation speed and of a first race rotation speed of a bearing, and subsequently obtaining a calculated thrust load on the basis of the first parameter and of the first race rotation speed.

11 Claims, 4 Drawing Sheets

(52) U.S. Cl.
CPC ............ *F16C 33/38* (2013.01); *F16C 41/007* (2013.01); *F16C 2233/00* (2013.01); *F16C 2360/23* (2013.01)

(58) Field of Classification Search
USPC .......................................................... 702/145
See application file for complete search history.

(56) References Cited

U.S. PATENT DOCUMENTS

| | | | |
|---|---|---|---|
| 2006/0245677 A1 | 11/2006 | Kenworthy et al. | |
| 2008/0013873 A1* | 1/2008 | Ishii .................... | F16C 33/7896 384/448 |
| 2009/0052825 A1* | 2/2009 | Ono .................... | B60B 27/0068 384/512 |
| 2016/0305845 A1* | 10/2016 | van der Ham ........ | F16C 41/008 |

OTHER PUBLICATIONS

Italian Search Report and Written Opinion issued in connection with corresponding IT Application No. 102016000029356 dated Nov. 29, 2016.

International Search Report and Written Opinion issued in connection with corresponding PCT Application No. PCT/EP2017/056497 dated Jun. 23, 2017.

International Preliminary Report on Patentability issued in connection with corresponding PCT Application No. PCT/EP2017/056497 dated Sep. 25, 2018.

\* cited by examiner

METHOD TO MONITOR A THRUST LOAD ON A ROLLING BEARING AND MACHINERY EQUIPPED WITH A SYSTEM TO MONITOR SAID THRUST LOAD

FIELD OF THE INVENTION

Embodiments of the subject matter disclosed herein correspond to a method to monitor a thrust load on a rolling bearing, and to a machinery equipped with a system to monitor said thrust load.

BACKGROUND OF THE INVENTION

In the field of 'Oil and Gas' machinery, like turbomachinery in general, are widely used.

Those kind of machineries comprise rotating parts, like shafts, that may be mounted on rolling bearings. Rolling bearings comprise a plurality of rolling elements, which may be balls or cylinders, located between an outer ring and an inner ring. The rolling elements may rotate on an inner race and an outer race respectively formed on the inner ring and on the outer ring of the bearing. The balls or cylinders may be coupled to a cage.

In order to lubricate and refrigerate the bearings, the machinery may be equipped with a lubricating circuit, feeding lubricant to the each bearing. The lubricant draining form the bearing may gather in a sump structure surrounding the bearing and it may be recirculated in the lubricating circuit.

Rolling bearing faults or malfunctioning may be due to bearing axial thrust (or simply thrust load) overloads or underloads.

The problem of overloads and underloads is particularly felt in machineries comprising a turbine and/or a compressor mounted on the same shaft. Turbines and compressors, especially axial or radial compressors, which may be of the multistage type, may generate axial loads on the shaft that may significantly change during different operating phases of the machinery.

In underload conditions a skidding between the rotating elements (balls of cylinder) and an inner and outer race of the bearing may arise. The presence of skidding between balls and races may reduce the useful life of the bearing.

An overload in the axial thrust load may compromise the physical integrity of the bearing and therefore generate malfunctioning.

As rolling bearings are among the top offenders in the failures statistics of turbomachineries, the enhancement of monitoring capabilities of rolling bearing thrust load could be beneficial. In fact, a malfunctioning of a rolling bearing may lead to serious damages, especially in turbomachines. Here, impellers or turbines are mounted on the shaft with a minimal distance from a stator, in order to operate correctly and efficiently. If a rolling bearing fails, impellers and turbines may contact the stator leading to a severe damage of the entire machinery.

In known applications, thrust load may only be estimated by indirect calculus and its real value is not under continuous monitoring. In particular, experimental models are used for indirect estimation of the thrust load from others machinery operating parameters.

The estimation models used in known applications may not give a sufficiently accurate measure of the value of the thrust load acting on bearings.

A continuous read of the axial thrust load value was performed only for testing purposes, using load cells or strain gages.

Those systems are difficult to be installed in the bearing housing in order to accurately measure the load, and are not suitable for permanent installation.

SUMMARY OF INVENTION

Therefore, there is a general need for an improved method to monitor a thrust load on a rolling bearing that may be based on parameters directly reflecting the bearing operating status.

An important idea is to estimate the thrust load of a rolling bearing based on a first parameter calculated on the basis of at least a bearing cage rotation speed and of a first race rotation speed of a bearing, and obtaining a calculated thrust load on the basis of the first parameter and of a first race rotation speed.

First embodiments of the subject matter disclosed herein correspond to a method to monitor a thrust load on a rolling bearing.

BRIEF DESCRIPTION OF THE DRAWINGS

The accompanying drawings, which are incorporated herein and constitute a part of the specification, illustrate exemplary embodiments of the present invention and, together with the detailed description, explain these embodiments.

In the drawings.

DETAILED DESCRIPTION

The following description of exemplary embodiments refers to the accompanying drawings.

The following description does not limit embodiments of the invention. Instead, the scope of embodiments of the invention is defined by the appended claims.

Figure 1:
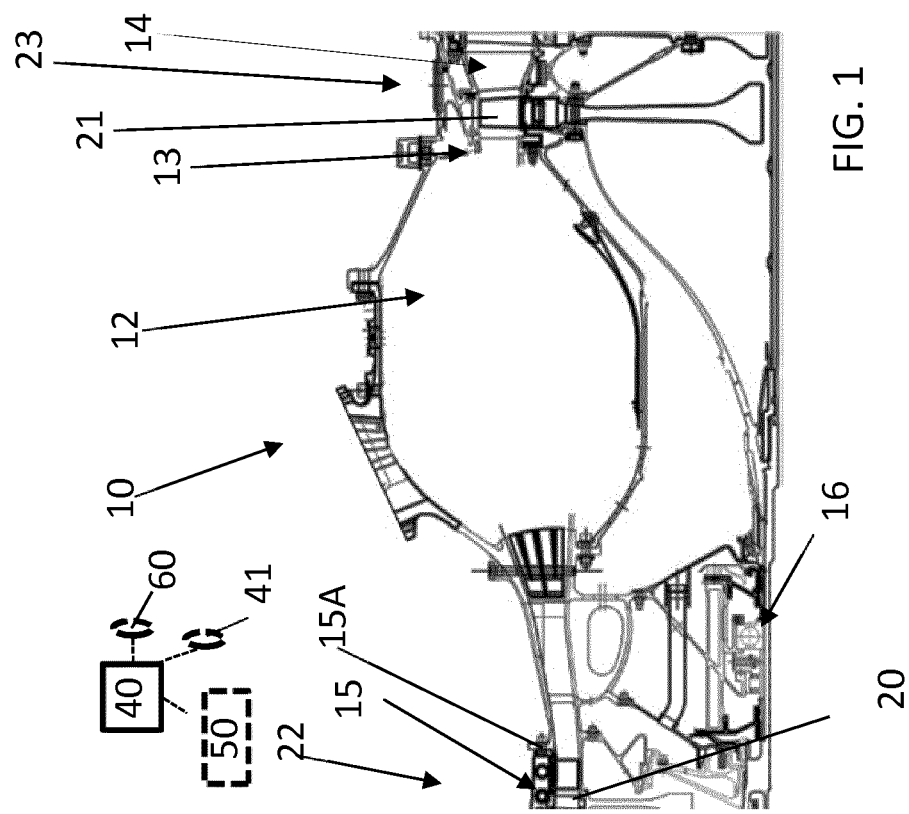
FIG. 1 schematically shows a machinery, and in particular a part of a turbomachinery comprised between a compressor and a turbine, in proximity of a burner.

With particular reference to FIG. 1, reference 10 indicates a machinery, in particular a turbomachinery, and more in particular a gas turbine.

The turbomachinery 10 comprises an axial air compressor 22 driven by a turbine 23. The compressor 22 comprises a plurality of compressor blades 20, and the turbine comprises a plurality of turbine blades 21. Both the compressor 22 and the turbine 23 may comprise a plurality of compressor or turbine stages (not shown in the drawings). The compressor blades 20 and the turbine blades 21 are installed on a common shaft 18.

The turbine blades 21 shown in FIG. 1, may cooperate with turbine nozzles 13 and stator nozzles 14 in order to operate correctly.

The shaft 18 may be supported by a rolling bearing 16 located between the axial compressor 22 and the turbine 23 and by further bearings (not shown) located at an inlet of the axial compressor 22, and/or in proximity of the outlet of the turbine.

The rolling bearing 16 may be refrigerated and lubricated by oil flowing in a scavenge line 19 in direct contact with the rolling bearing 16.

The bearing may comprise an outer race 16O, which may be coupled to a stator, and an inner race 16I, which may be coupled to the shaft 18. Between the inner race 16I and the outer race 16O a plurality of rotating elements like bearing balls 16B may be located. The plurality of rotating elements may be coupled to a bearing cage 16C.

A machinery control unit 40 may control the operation of the machinery through a plurality of sensors. The control unit may be part of a system to control the thrust load on one or more of the rolling bearings of the machinery.

The system may also comprise, coupled to the control unit 40, a speed sensor 41 configured to read the rotating speed of a race of the bearing 16. The race of the bearing may be the inner race 16I, the outer race 16O, or both the inner and the outer race. In some embodiment the inner race 16I of the bearing 16 may be torsionally coupled to the shaft 18 of the turbomachinery; in this case the rotation speed of the shaft may be the same of the inner race. Therefore the sensor 41 may be mounted in a position of the shaft that is far from the monitored bearing 16.

A further sensor 60 may be placed close to the bearing 16, in order to read the rotation speed of the cage 16C (bearing cage) coupled to the rotating parts (balls or cylinders) of the bearing 16.

The speed sensors 41, 60 may be of any known type, and may be for example a keyphasor or a different tachometer.

The system may also comprise, coupled to the control unit 40, a monitor 50 (for example a touch screen or a control panel of the machinery), which may show alerts alarms and/or any other kind of information useful to control the operating status of a machinery. Furthermore the control unit may be coupled with a debris sensor 42 placed in the scavenge line 19.

The control unit 40 may be configured to monitor the thrust load on a rolling bearing 16, calculated on the basis of the bearing cage rotation speed CS read from the sensor 60 and on the basis of a first race rotation speed SS, read from the inner race rotation speed sensor 41 (or from the shaft speed sensor).

In the present description, reference will be made to the steps necessary to monitor the thrust load (axial load) on the rolling bearing 16, but of course the thrust load L may be monitored also on other bearings, for example on the bearing placed at the entrance of the compressor, on the bearing placed at the outlet of the turbine or anywhere else on the machinery.

Furthermore the control unit 40, may show on the monitor 50 information regarding the health status of the rolling bearing 16, obtained on the basis of the method herein described. Those information may be useful for an operator that may control the machinery.

Figure 2:
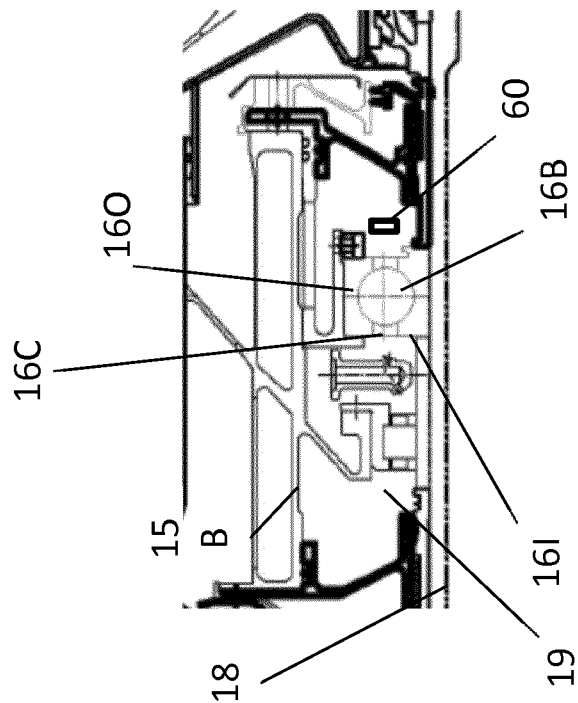
FIG. 2 is an enlarged view of a particular of FIG. 1, showing in a greater detail a rolling bearing.
Figure 4:
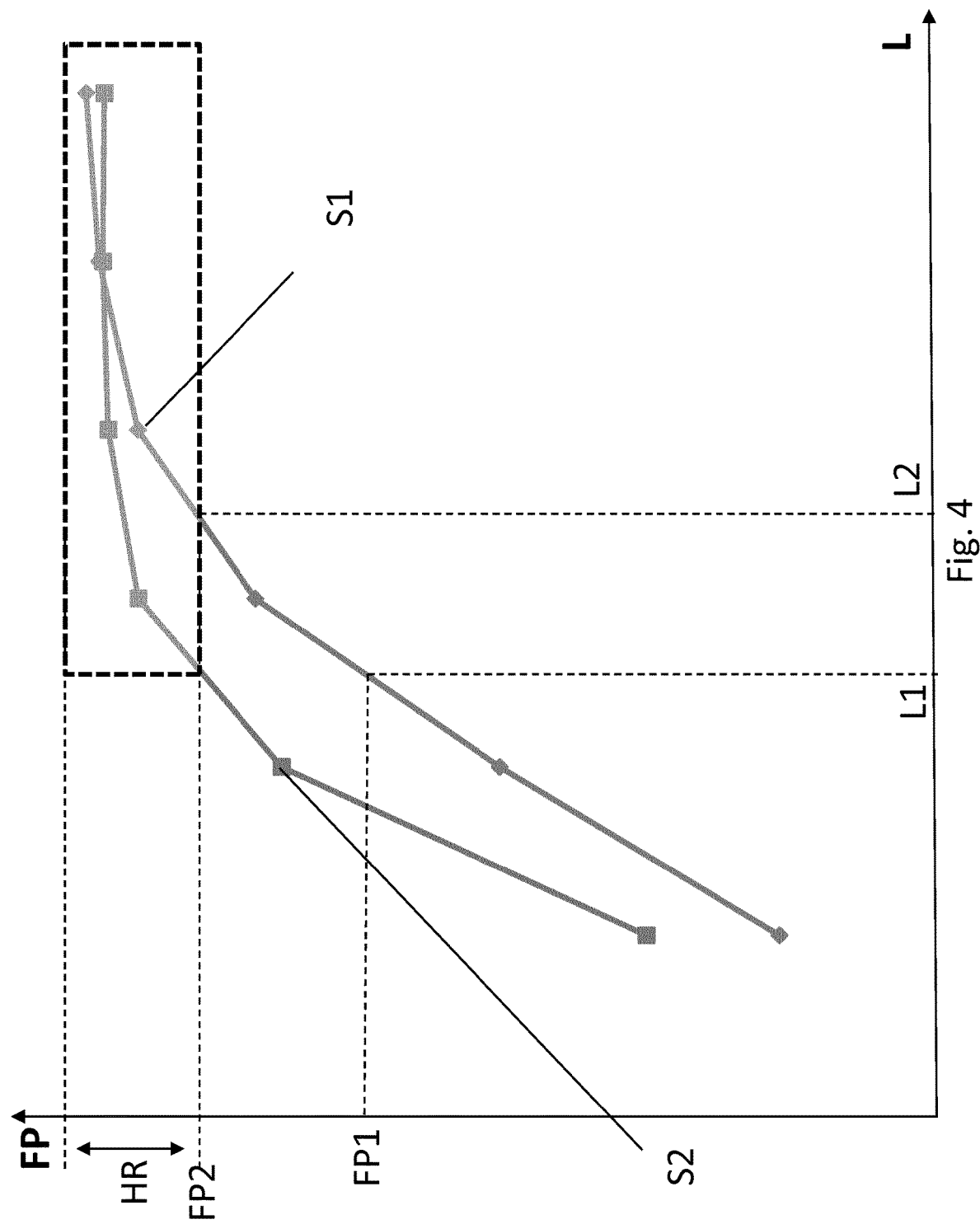
FIG. 4 is a graphical representation of a step of the method of FIG. 3.

With reference to FIG. 2, the control unit 40, in order to monitor a thrust load on a rolling bearing, may perform one or more of the following steps:

preliminary step F0: obtaining a value of a bearing cage rotation speed CS and of a first race rotation speed SS; it should be noted that these values may be read directly from the sensors 60 and/or 41, or they may be calculated in any known way starting from different parameters. These values may also be estimated on the basis of a plurality of variables. In an embodiment, the first race rotation speed SS is the rotation speed of the inner race. In some embodiments the speed of the inner race may be the shaft speed.

first step F1: obtaining a first parameter FP on the basis of the values of at least a bearing cage rotation speed CS and of a first race rotation speed SS of a bearing. In an embodiment, the first parameter FP, is obtained dividing the bearing cage rotation speed CS by the first race rotation speed SS. This first parameter may correspond to a Fundamental Train Frequency (FTF), or cage frequency, of the bearing.

a second step F2: of obtaining a calculated value of the thrust load L (axial load) acting on the bearing, on the basis of the first parameter FP and of the first race rotation speed SS. The thrust load L may be obtained as an example form the diagram of FIG. 4 that may correlate a plurality of values of the first parameter FP with a plurality of values of the axial thrust load, for any given first race rotation speed S1, S2, Sn). Speeds S1, S2 . . . Sn on the graph may be been obtained through data analysis of experimental tests campaign. As an example, given a first race rotation speed S2, and given a value of the first parameter FP1, the value of the load L may be derived graphically as represented in FIG. 4, or through any other suitable numeric approach. By way of example a suitable numerical approach may be an estimation of the load value that minimizes the distance (Euclidian or other) between the FP measured and the polynomial curves that expresses FP as function of load.

After the second step F2 a third step F3 may be performed, where it is verified if the calculated thrust load L is equal or above a first predetermined value $L_{MAX}$. If the calculated thrust load L is equal or above the predetermined value $L_{MAX}$, an overload alarm is generated (ninth step F9). The alarm may be simply displayed on the monitor 50, or the control unit 40 may act automatically according to predetermined procedures in order to diminish the value of the load L, and even to stop the turbomachinery if it is needed.

If the thrust load value is below $L_{MAX}$, a fourth F4 and/or a fifth step F5 may be performed.

As discussed above, after the second step F2, the fourth step F4 may be performed.

Figure 3:
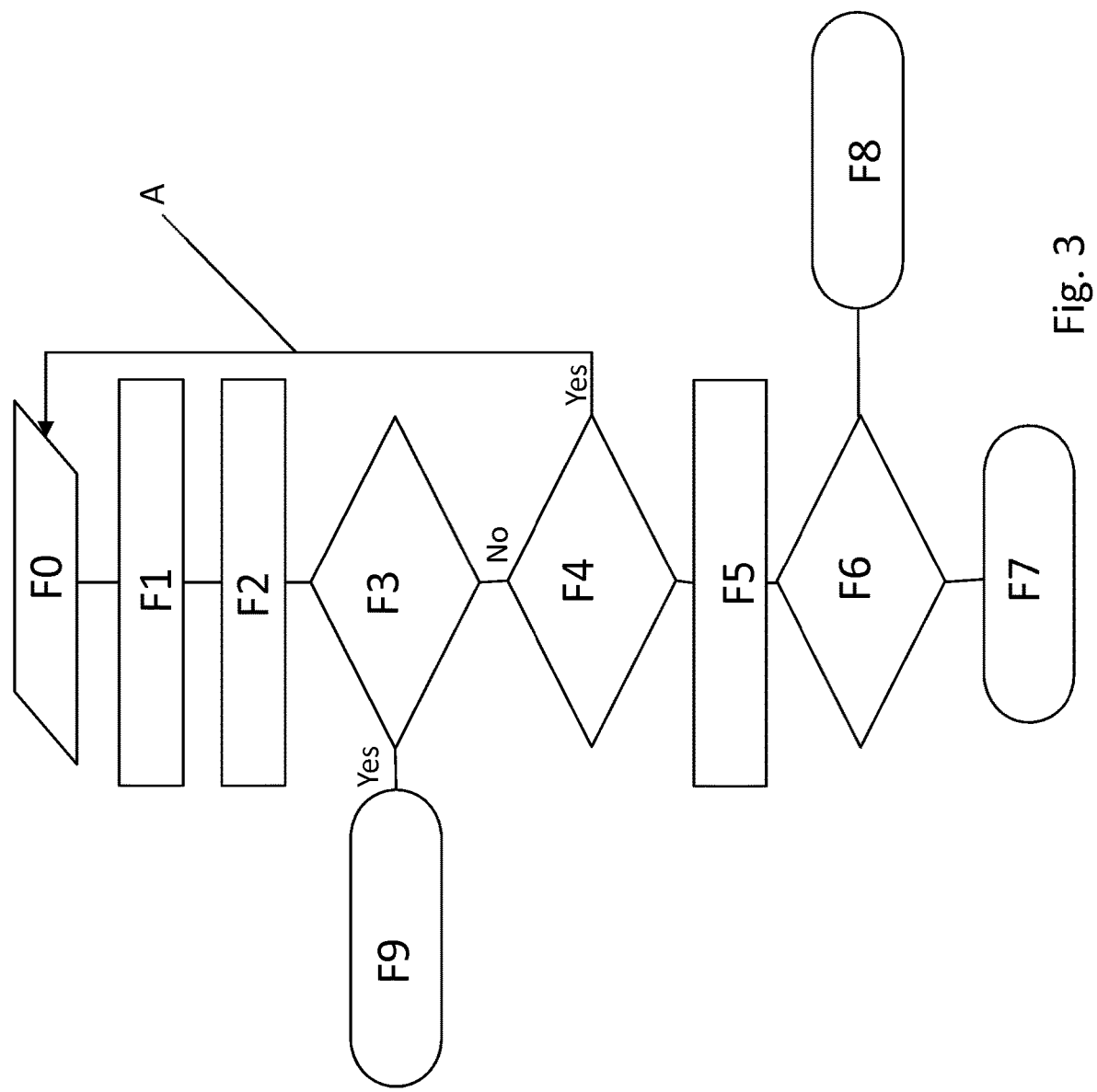
FIG. 3 is a schematic view of a plurality of steps performed to monitor a thrust load of a rolling bearing, for example of the rolling bearing of FIG. 2.

In the fourth step F4 is verified if the first parameter FP falls within a first range HR and, if the first parameter FP falls inside the first range HR, the first step F1 is performed again with updated or new values (obtained in F0, see line A, FIG. 3) of the bearing cage rotation speed CS and of the first race rotation speed SS.

If the first parameter FP falls out the first range HR a sixth step F6 may be performed.

The first range HR may be defined by design characteristics of the bearing, and it is graphically represented in FIG. 4. The fact that the first parameter falls out of the first range HR, which may also be defined as healthy range of the bearing, may show the presence of a potential problem on the bearing.

In order to assess what is the nature of the problem, the sixth step F6 may be performed. In this step it is verified if a variation of the first race rotation speed ΔSS corresponds to an expected variation L1, L2 of the bearing cage rotation speed CS, at the calculated thrust load L.

Figure 5:
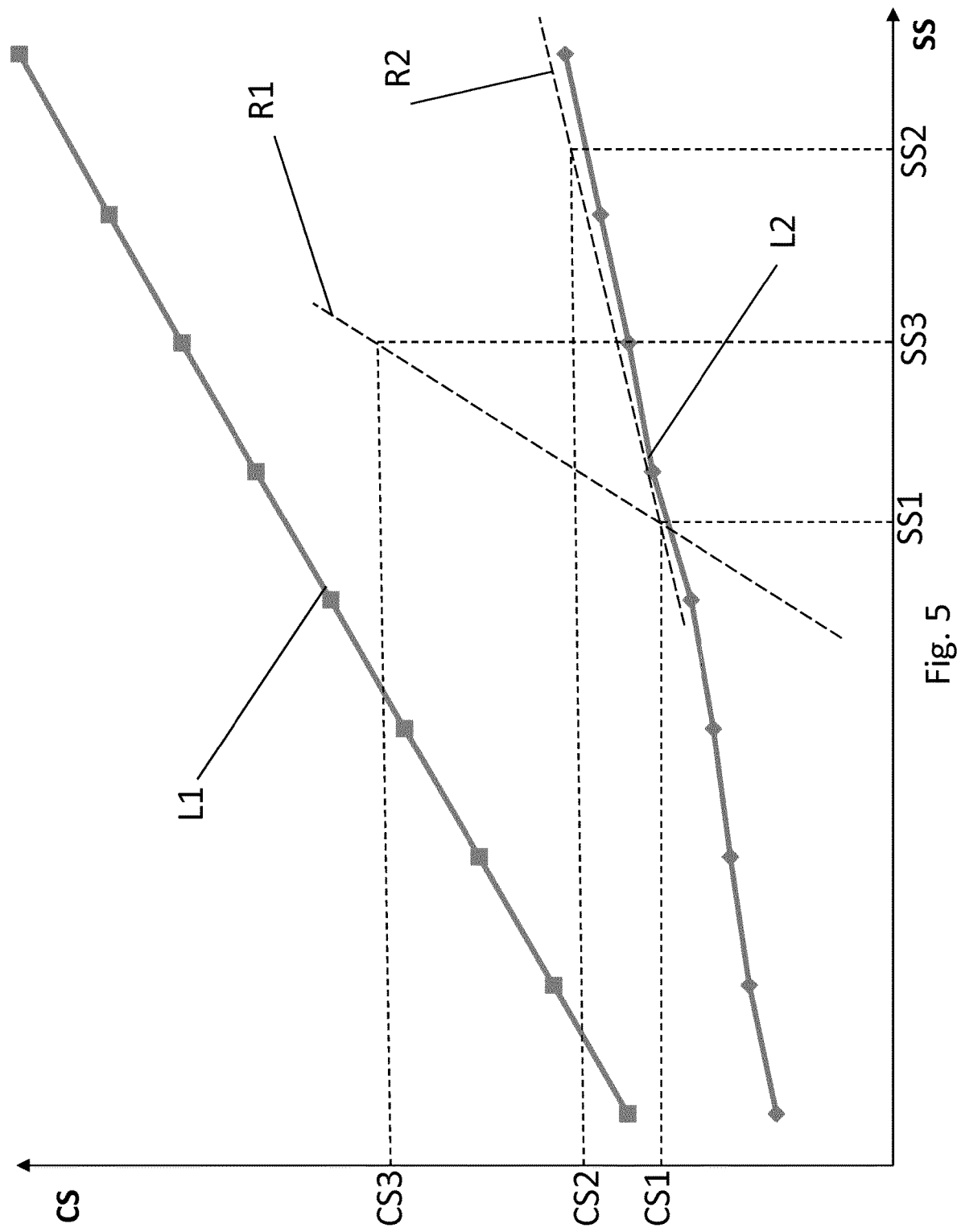
FIG. 5 is a graphical representation a further step of the method of FIG. 3.

This step is graphically represented in FIG. 5. Preliminarily it should be noted that the graph of FIG. 5 correlates a plurality of values of the bearing cage rotation speed CS to a plurality of values of the first race rotation speed SS, given a plurality of known thrust loads L1, L2, Ln. . . . This correlation may be obtained by experimental values.

According to the sixth step F6, the predicted variation is obtained by selecting, on the basis of the calculated thrust load L, one load curve L1, L2 between a plurality of load curves L1, L2 each correspondent to a given load (in underload condition), and by verifying if at a determined point CS1, SS1, a first slope of first a curve R describing the variation of the bearing cage rotation speed CS with respect to the first race rotation speed SS corresponds, within a predetermined interval, to the slope of the selected load curve L1 in the same point CS1, SS1.

Graphically, it is possible to see that the slope of the line R1 passing for the points CS1, SS1-CS3, SS3, representing the variation of CS in function of SS, do not correspond to the slope of the curve L2 representing the predicted variation of cage speed with respect to the first race speed for the load L2. This means that the bearing is skidding due to anomalous bearing conditions, which, by way of example, may comprise a lubrication problem, or any other known bearing problem. In this case an alarm (seventh step F7) may be generated.

On the contrary the line R2 passing for the points CS1, SS1-CS2, SS2, corresponds (within a predetermined interval) to the slope of the curve L2. In this case, the skidding of the bearing is due to underload of the bearing itself. Therefore the control unit 40 (or an operator) may act on the machinery in order to solve the problem, for example by correcting the thrust load L on the bearing.

By way of example a value of the load correction may be calculated as shown in the eight step F8, by comparing the calculated thrust load L with a predetermined design thrust load $L_D$. The predetermined thrust load $L_D$ may be the minimum load value for making the bearing work in a healthy range condition given a first race speed SS. This value may be derived directly from the design of the bearing, as it is graphically represented again in FIG. 4. Given a first parameter value of FP2 and a first race speed of S2, the predetermined thrust load $L_D$ is L2.

Additionally, after the fourth step F4 a fifth step F5 may be performed, where a skidding percentage is calculated. The skidding percentage may be calculated comparing the first parameter FP with a predetermined design value of the first parameter $FP_D$. In this step the ratio between the variation of CS and the variation of SS may be compared with the expected range (experimentally determined for skidding due to underload).

The skidding percentage may be used by the control unit 40 to trigger the thrust load L adjustment that may be available on the machinery, and it may also be displayed on the monitor 50, for an operator.

According to a possible embodiment, the first parameter FP may be also obtained on the basis of a second race rotation speed ORS. This may be particularly useful if the second race rotation speed is the outer race speed. According to this configuration the outer race of the bearing is not fixed, and the shaft may be supported by another rotating element. In this case the first parameter may be calculated as the ratio between the CS and the average of inner and outer race speeds.

It should be noted that a sequence of steps of an exemplificative method was described. Of course the steps of the method may be executed in a different order or sequence, and some of the described steps may also be omitted.

It should be also noted that, in order to make the description more understandable, reference to diagrams was made. The results here described as obtained in a graphical way may of course be obtained, according to different embodiments, through any suitable numeric method.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method to monitor a thrust load on a rolling bearing, comprising:
    obtaining a first parameter based on a bearing cage rotation speed and a first race rotation speed of a bearing;
    obtaining a calculated thrust load on the rolling bearing based on the first parameter and the first race rotation speed; and
    verifying if the first parameter falls within a first range, and (i) if the first parameter falls out of the first range, a verification is performed to determine whether the first race rotation speed corresponds to a predicted variation at the calculated thrust load, and (ii) if the first parameter falls inside the first range, the step of obtaining a first parameter is repeated with new values of the bearing cage rotation speed and the first race rotation speed,
    wherein a load correction is performed if the first race rotation speed does not correspond to the predicted variation at the calculated thrust load to improve bearing performance and extend bearing life.

2. The method of claim 1, wherein the first parameter is obtained by dividing the bearing cage rotation speed by the first race rotation speed.

3. The method of claim 1, wherein the first parameter is also obtained on the basis of a second race rotation speed of the bearing.

4. The method of claim 1, wherein the predicted variation is obtained by selecting, on the basis of the calculated thrust load, one load curve between a plurality of load curves each correspondent to a given load, and by verifying if at a determined point, a first slope of a first curve describing the variation of the bearing cage rotation speed in function of the first race rotation speed corresponds, within a predetermined interval, to the slope of the selected load curve in the same determined point.

5. The method of claim 1, wherein the load correction is calculated comparing the calculated thrust load with a predetermined design thrust load.

6. The method of claim 1, wherein if the variation of the first race rotation speed does not correspond to the predicted variation at the calculated thrust, an alarm is generated indicating an anomalous bearing condition.

7. The method of claim 1, further comprising the step of calculating a skidding percentage.

8. The method of claim 7, wherein the skidding percentage is calculated comparing the first parameter with a predetermined design value of the first parameter.

9. Machinery comprising a rotating shaft supported by at least a bearing, the bearing comprising at least a first race, a second race and a cage coupled to a plurality of rolling elements disposed between the first race and the second race, the machinery being controlled by a control unit configured to perform the method of claim 1.

10. The machinery of claim 9 comprising a sensor configured to read a cage speed of the bearing.

11. The machinery of claim 9, further comprising at least a turbine and at least an impeller mounted on the shaft.

* * * * *